United States Patent
Lee et al.

(10) Patent No.: US 8,315,304 B2
(45) Date of Patent: Nov. 20, 2012

(54) METHOD AND APPARATUS FOR ENCODING AND DECODING TRANSFORM COEFFICIENTS

(75) Inventors: Bae-keun Lee, Bucheon-si (KR); Jianle Chen, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 835 days.

(21) Appl. No.: 12/397,768

(22) Filed: Mar. 4, 2009

(65) Prior Publication Data

US 2009/0232204 A1 Sep. 17, 2009

(30) Foreign Application Priority Data

Mar. 17, 2008 (KR) .................. 10-2008-0024369

(51) Int. Cl.
*H04N 7/12* (2006.01)
*H04B 1/66* (2006.01)
(52) U.S. Cl. .................. 375/240.01; 375/240
(58) Field of Classification Search .............. 382/232, 382/239, 236, 247; 375/240.01–240.26
See application file for complete search history.

(56) References Cited

U.S. PATENT DOCUMENTS

| | | | |
|---|---|---|---|
| 2003/0081850 A1* | 5/2003 | Karczewicz et al. | 382/247 |
| 2004/0028127 A1 | 2/2004 | Subramaniyan | |
| 2007/0110162 A1 | 5/2007 | Turaga et al. | |
| 2008/0267513 A1* | 10/2008 | Sankaran | 382/232 |
| 2008/0310507 A1* | 12/2008 | Ye et al. | 375/240.12 |
| 2009/0175332 A1* | 7/2009 | Karczewicz et al. | 375/240.03 |

* cited by examiner

*Primary Examiner* — Behrooz Senfi
(74) *Attorney, Agent, or Firm* — Sughrue Mion, PLLC

(57) ABSTRACT

A method of encoding transform coefficients and a transform coefficient encoding apparatus, and a method of decoding transform coefficients and a transform coefficient decoding apparatus are provided. The method of encoding the transform coefficients includes reading transform coefficients in a current block, determining whether a first transform coefficient having an absolute value greater than a predetermined threshold value exists in the transform coefficients in the current block, generating first flag information indicating whether the first transform coefficient exists, dividing the first transform coefficient from information of a second transform coefficient that is remaining transform coefficients excluding the first transform coefficient, and encoding the first transform coefficients and the second transform coefficients separately, thereby more efficiently using a correlation between each of the transform coefficients.

18 Claims, 11 Drawing Sheets

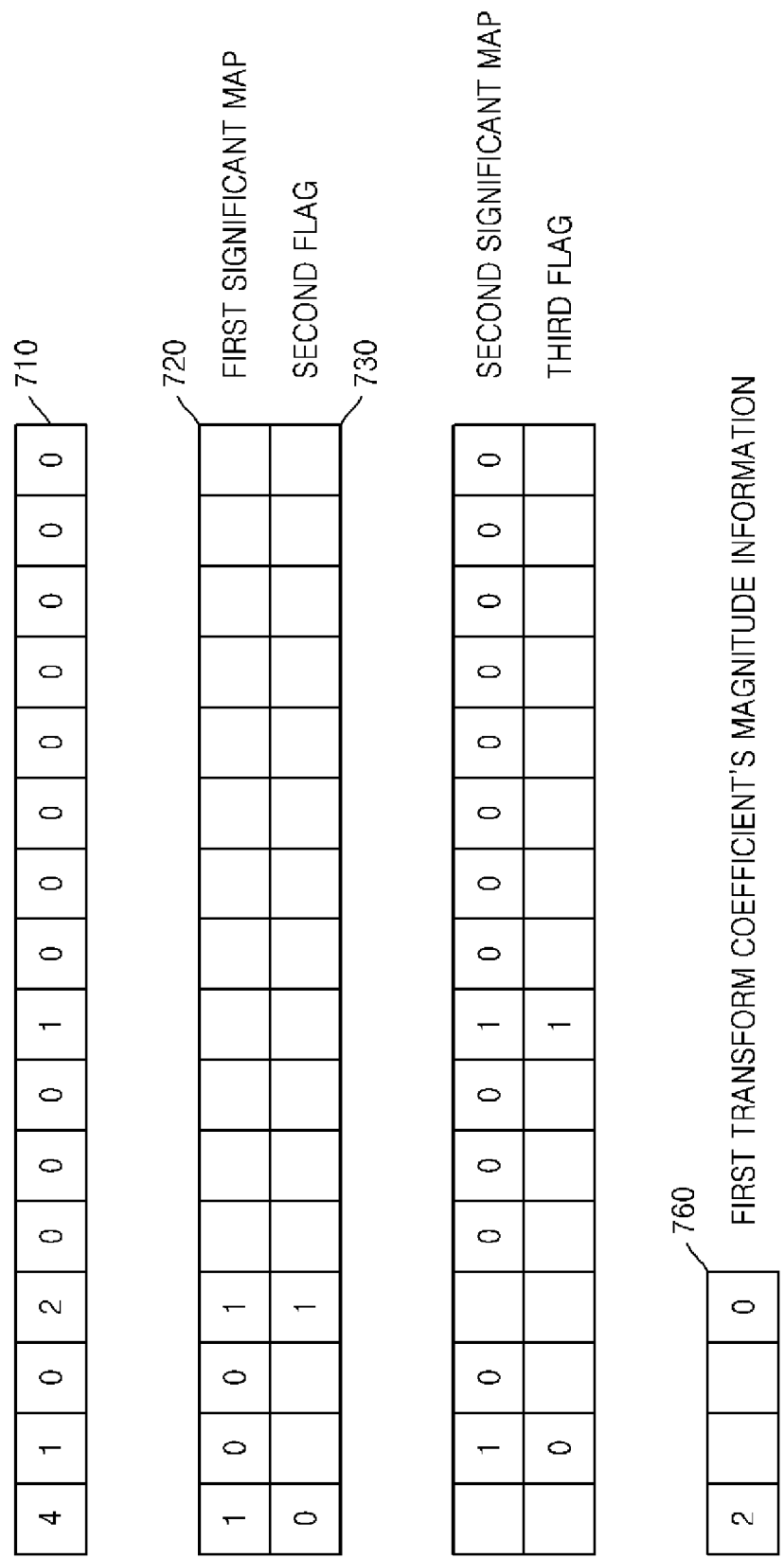

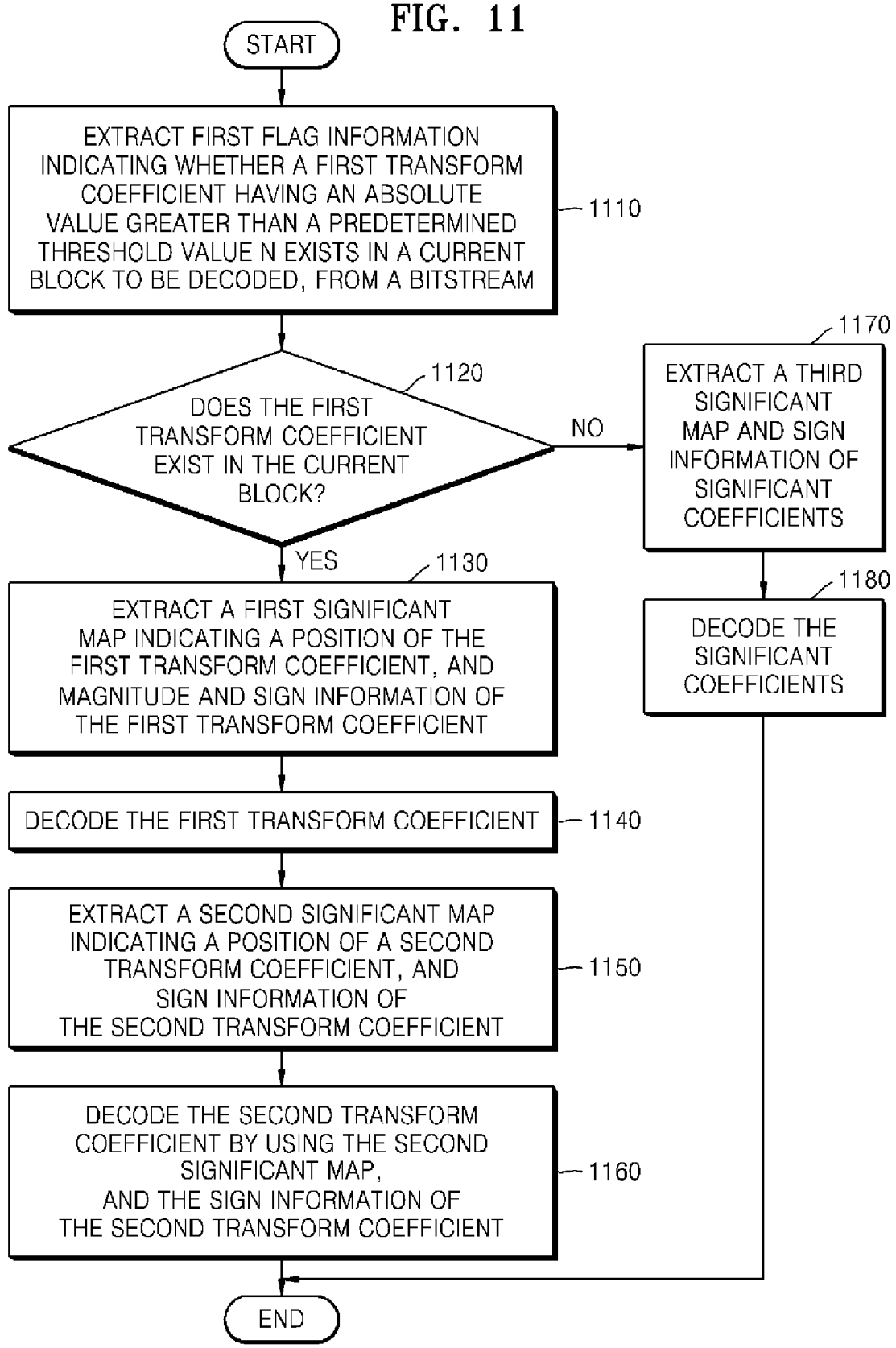

METHOD AND APPARATUS FOR ENCODING AND DECODING TRANSFORM COEFFICIENTS

CROSS-REFERENCE TO RELATED PATENT APPLICATION

This application claims priority from Korean Patent Application No. 10-2008-0024369, filed on Mar. 17, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to encoding and decoding an image, and more particularly, to encoding transform coefficient information when an image is encoded, and decoding the transform coefficient information.

2. Description of the Related Art

An image compression technique such as H.264/Moving Picture Experts Group-4 (MPEG-4) Advanced Video Coding (AVC) divides an image in units of block having a predetermined size, and performs inter prediction or intra prediction in block units, thereby generating a prediction image. Afterward, the image compression technique transforms a residual that is a difference value between the prediction image and an original image, and performs quantization and variable length coding on the residual value, thereby performing encoding. For example, in the H.264/MPEG-4 AVC, discrete cosine transformation (DCT) and quantization are performed in units of residual blocks having a 4×4 size, and then a syntax element of residual data is generated for each 4×4 residual block unit. Examples of the syntax elements of 4×4 residual blocks defined in H.264 are coded_block_flag, significant_coeff_flag[i], coeff_sign_flag[i], and the like.

FIG. 1 is a flowchart of a related art method of encoding transform coefficients.

Referring to FIG. 1, coded_block_flag is encoded, wherein the coded_block_flag indicates whether a non-zero transform coefficient value exists in 16 quantized transform coefficients included in a 4×4 transform coefficient block that is obtained by transforming and quantizing a residual block having a 4×4 size. When the coded_block_flag is 0, this means that there is no more information to be transmitted in the given 4×4 transform coefficient block. In operation 10, when a non-zero transform coefficient (hereinafter, referred to as 'a significant coefficient') exists in the 4×4 transform coefficient block, the coded_block_flag is set as 1, and a significant map indicating a position of the significant coefficient is generated. The significant map indicates whether a transform coefficient according to each scan index is the significant coefficient or 0, and uses significant_coeff_flag[i] for the indication. Here, the significant_coeff_flag[i] indicates whether a transform coefficient value of an $i_{th}$ scan index from among the 16 quantized transform coefficients in the 4×4 transform coefficient block is 0 or not.

In operation 11, an end of block (EOB) flag is generated so as to indicate whether each significant coefficient is a last significant coefficient in the 4×4 transform coefficient block. If the EOB flag is 1, a corresponding significant coefficient is the last significant coefficient in the 4×4 transform coefficient block. If the EOB flag is 0, a corresponding significant coefficient is not the last significant coefficient.

In operation 12, a Greater than 1 (GR1) flag is generated so as to indicate whether an absolute value of each significant coefficient has a value greater than 1. If the GR1 flag is 1, a corresponding significant coefficient has an absolute value greater than 1. If the GR1 flag is 0, this means that an absolute value of a corresponding significant coefficient is 1.

In operation 13, magnitude information of the significant coefficient having the GR1 flag that is 1, in other words, the magnitude information of the significant coefficient having an absolute value greater than 1, is encoded. At this time, in order to save the number of bits allocated to the magnitude information, a difference value obtained by subtracting 2 from an absolute value of the significant coefficient is generally encoded as the magnitude information.

In operation 14, sign information of each significant coefficient existing in the 4×4 transform coefficient block is encoded.

FIG. 2A is an example of a related art 4×4 transform coefficient block. FIG. 2B is an example of a significant map corresponding to the 4×4 transform coefficient block of FIG. 2A.

Referring to FIGS. 2A and 2B, while each of the transform coefficients in a 4×4 transform coefficient block 21 is scanned according to a predetermined scan order based on an arrow direction illustrated in FIG. 2A, a significant coefficient is marked as 1 and a zero transform coefficient is marked as 0 so that a significant map 22 is generated.

To be more specific, referring to FIG. 3, the 4×4 transform coefficient block 21 illustrated in FIG. 2A is scanned according to the predetermined scan order so that the transform coefficients are arrayed in a one-dimensional array 310. From among the transform coefficients arrayed in the one-dimensional array 310, the significant coefficient is marked as 1, and the zero transform coefficient is marked as 0 so that a one-dimensional significant map 320 is generated. An EOB flag 330, indicating whether each of significant coefficients is a last significant coefficient, is allocated to each of the significant coefficients having a value 1 in the significant map 320. Also, for each of the significant coefficients, 1 is allocated to a significant coefficient having an absolute value greater than 1, and 0 is allocated to a significant coefficient having an absolute value less than 1 so that a GR1 flag 340 is generated. Afterward, magnitude information 350 is generated by subtracting 2 from an absolute value of a significant coefficient having a GR1 flag that is a value 1. As illustrated in FIG. 3, a value 1 is generated as magnitude information of the first transform coefficient having the value 3, wherein the value 1 is obtained by subtracting 2 from an absolute value 3 of a first transform coefficient which has a value 3 and which is from among the transform coefficients arrayed in the one-dimensional array 310. A value 0, obtained by subtracting 2 from an absolute value 2 of a fourth transform coefficient, is generated as magnitude information of the fourth transform coefficient having the value 2.

In this manner, the related art method divides transform coefficients into non-zero significant coefficients and zero transform coefficients, and encodes positions and magnitude information of the non-zero significant coefficients as transform coefficient information. However, in the case where the non-zero significant coefficients have a broad distribution, that is, in the case where a difference between each of absolute values of the non-zero significant coefficients is great, the related art method is not efficient when Context Adaptive Binary arithmetic Coding (CABAC) with respect to the significant map is performed. This is because it is difficult to select an appropriate probability model for encoding the non-zero significant coefficients when the difference between each of the non-zero significant coefficients is great.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method of encoding transform coefficients, and a transform coefficient encoding apparatus, which divide the transform coefficients into group units according to a predetermined threshold value and encode the transform coefficients according to the group units so as to more efficiently use a correlation between each of the transform coefficients and to improve a compression performance of the transform coefficients, and a method of decoding the transform coefficients and a transform coefficient decoding apparatus.

According to an aspect of the present invention, there is provided a method of encoding transform coefficients, the method including the operations of: reading transform coefficients in a current block according to a predetermined scan order, determining whether a first transform coefficient having an absolute value greater than a predetermined threshold value N (where N is a positive number greater than 2) exists in the transform coefficients in the current block, and generating first flag information indicating whether the first transform coefficient exists; encoding information of the first transform coefficient; encoding information of a second transform coefficient that indicates residual transform coefficients existing in the current block, except for the first transform coefficient; and adding the first flag information, the encoded information of the first transform coefficient, and the encoded information of the second transform coefficient to a bitstream.

According to another aspect of the present invention, there is provided a transform coefficient encoding apparatus including: a first flag generation unit reading transform coefficients in a current block according to a predetermined scan order, determining whether a first transform coefficient having an absolute value greater than a predetermined threshold value N (where N is a positive number greater than 2) exists in the transform coefficients in the current block, and generating first flag information indicating whether the first transform coefficient exists; a first transform coefficient encoding unit encoding information of the first transform coefficient; a second transform coefficient encoding unit encoding information of a second transform coefficient that indicates residual transform coefficients existing in the current block, except for the first transform coefficient; and a multiplexing unit adding the first flag information, the encoded information of the first transform coefficient, and the encoded information of the second transform coefficient to a bitstream.

According to another aspect of the present invention, there is provided a method of decoding transform coefficients, the method including the operations of: extracting first flag information indicating whether a first transform coefficient having an absolute value greater than a predetermined threshold value N (where N is a positive number greater than 2) exists in a current block to be decoded, from a bitstream; extracting a first significant map indicating a position of the first transform coefficient, and magnitude and sign information of the first transform coefficient from the bitstream when it is determined that the first transform coefficient exists in the current block according to a result of reading the extracted first flag information; decoding the first transform coefficient by using the extracted first significant map, and the extracted magnitude and sign information of the first transform coefficient; extracting a second significant map indicating a position of a second transform coefficient that indicates residual transform coefficients excluding the first transform coefficient, and sign information of the second transform coefficient from the bitstream; and decoding the second transform coefficient by using the extracted second significant map and the extracted sign information of the second transform coefficient.

According to another aspect of the present invention, there is provided a transform coefficient decoding apparatus including: a first flag information extraction unit extracting first flag information indicating whether a first transform coefficient having an absolute value greater than a predetermined threshold value N (where N is a positive number greater than 2) exists in a current block to be decoded, from a bitstream; a first transform coefficient decoding unit extracting a first significant map indicating a position of the first transform coefficient, and magnitude and sign information of the first transform coefficient from the bitstream when it is determined that the first transform coefficient exists in the current block according to a result of reading the extracted first flag information, and decoding the first transform coefficient by using the extracted first significant map and the extracted magnitude and sign information of the first transform coefficient; and a second transform coefficient decoding unit extracting a second significant map indicating a position of a second transform coefficient that indicates residual transform coefficients excluding the first transform coefficient, and sign information of the second transform coefficient from the bitstream, and decoding the second transform coefficient by using the extracted second significant map and the extracted sign information of the second transform coefficient.

BRIEF DESCRIPTION OF THE DRAWINGS

The above and other aspects of the present invention will become more apparent by describing in detail exemplary embodiments thereof with reference to the attached drawings in which:

FIG. 7 is a reference diagram for illustrating a procedure of arraying the transform coefficient block of FIG. 6A in a one-dimensional array, and encoding the transform coefficient block, according to another exemplary embodiment of the present invention;

FIG. 11 is a flowchart of a method of decoding a transform coefficient, according to another exemplary embodiment of the present invention.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
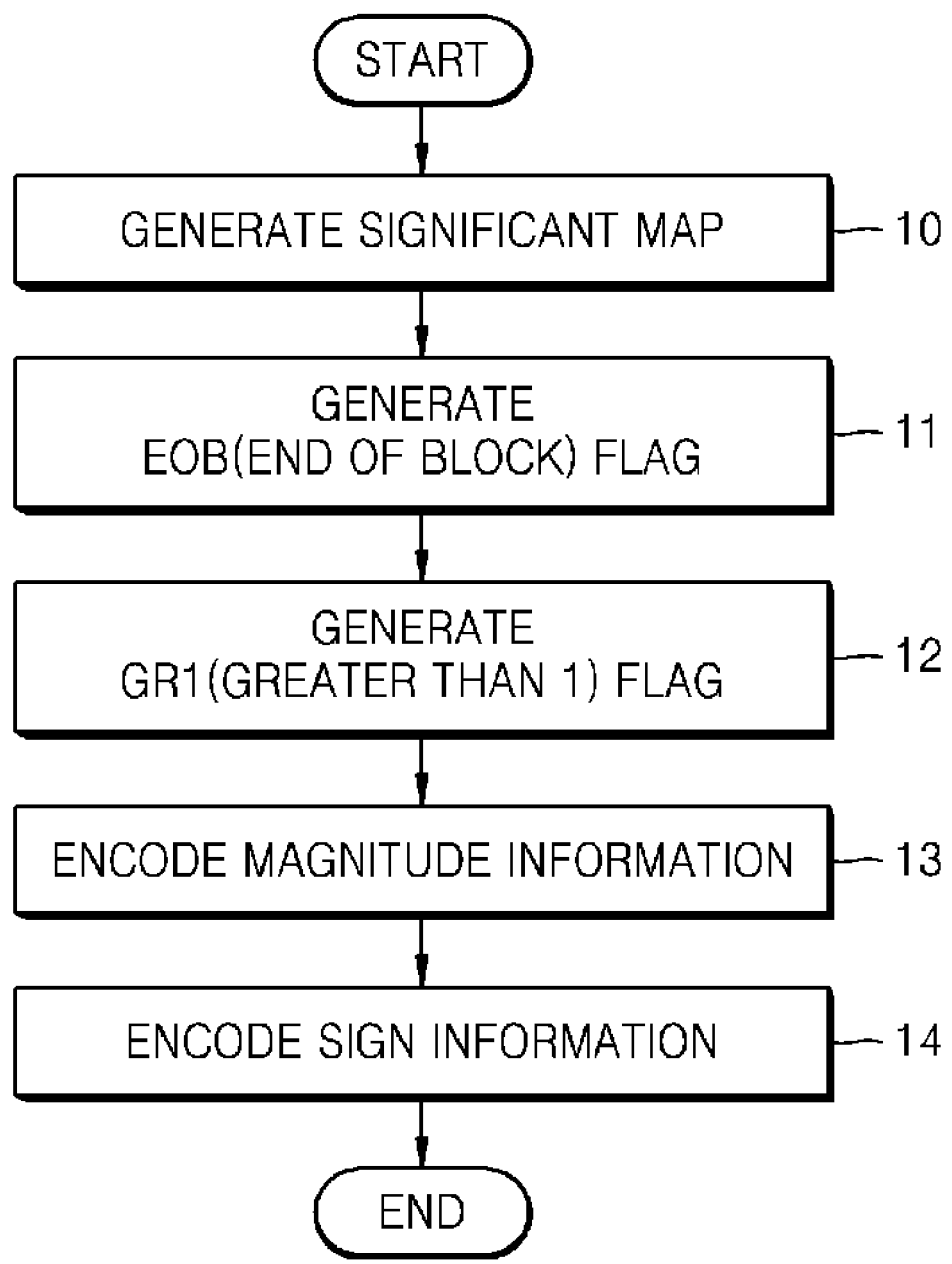
FIG. 1 is a flowchart of a related art method of encoding transform coefficients.
Figure 2A:
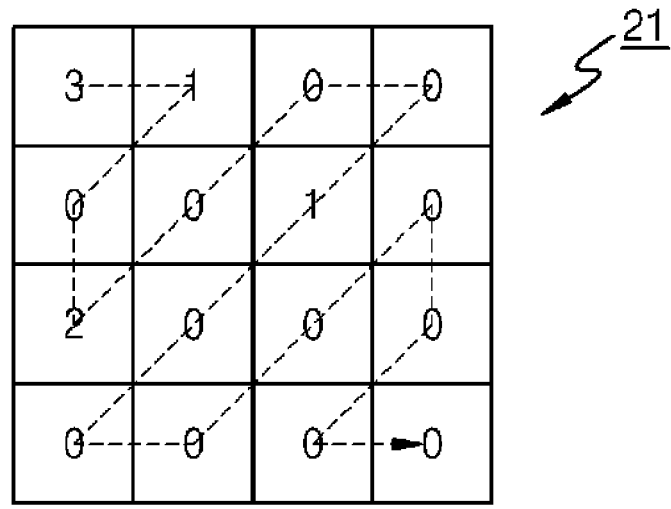
FIG. 2A is an example of a related art 4×4 transform coefficient block.
Figure 2B:
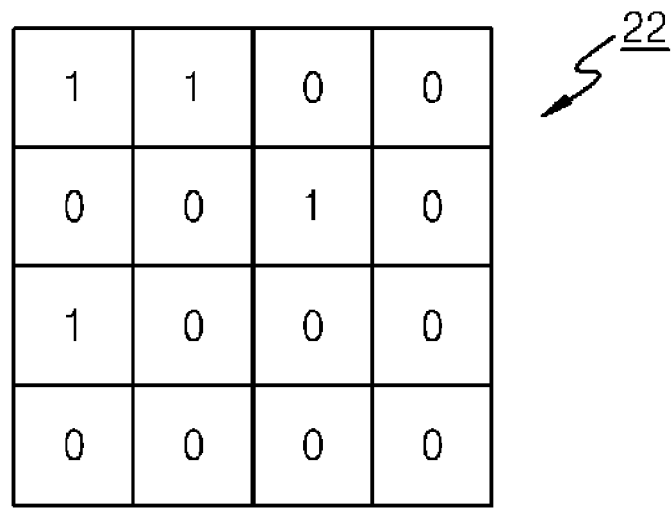
FIG. 2B is an example of a significant map corresponding to the 4×4 transform coefficient block of FIG. 2A.
Figure 3:
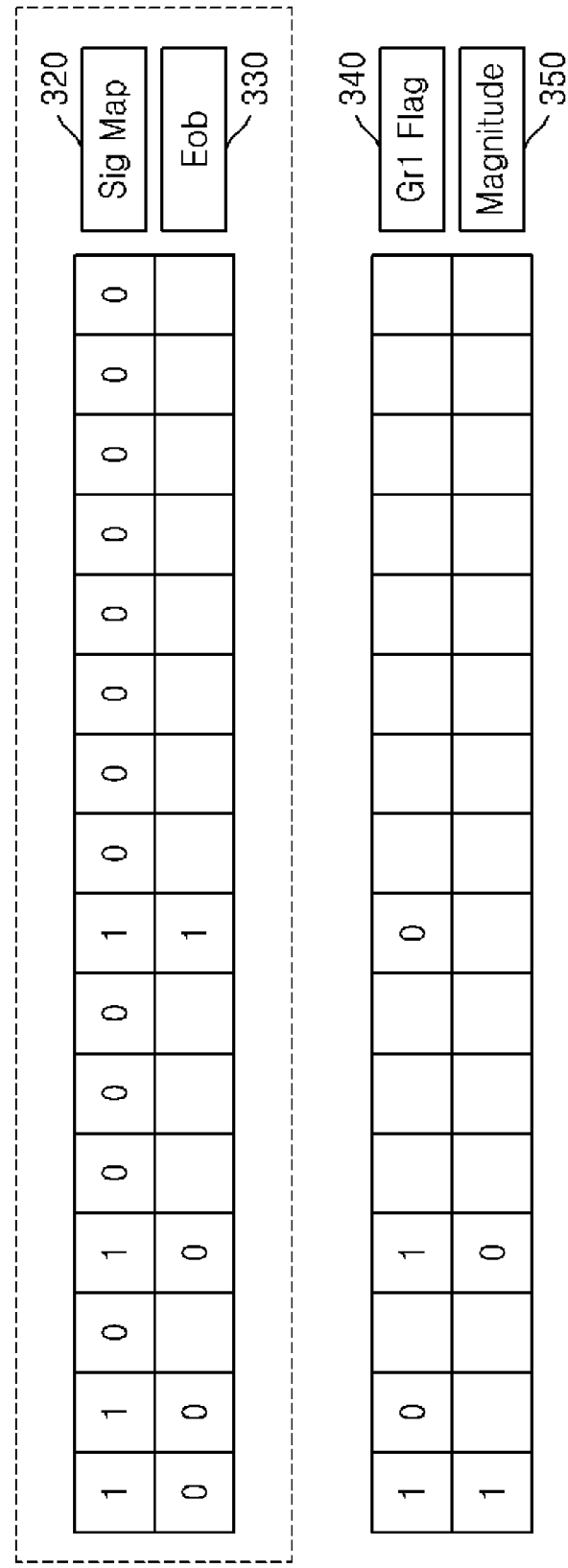
FIG. 3 is a reference diagram for illustrating a related art procedure of arraying the 4×4 transform coefficient block of FIG. 2A in a one-dimensional array, and encoding the 4×4 transform coefficient block.
Figure 4:
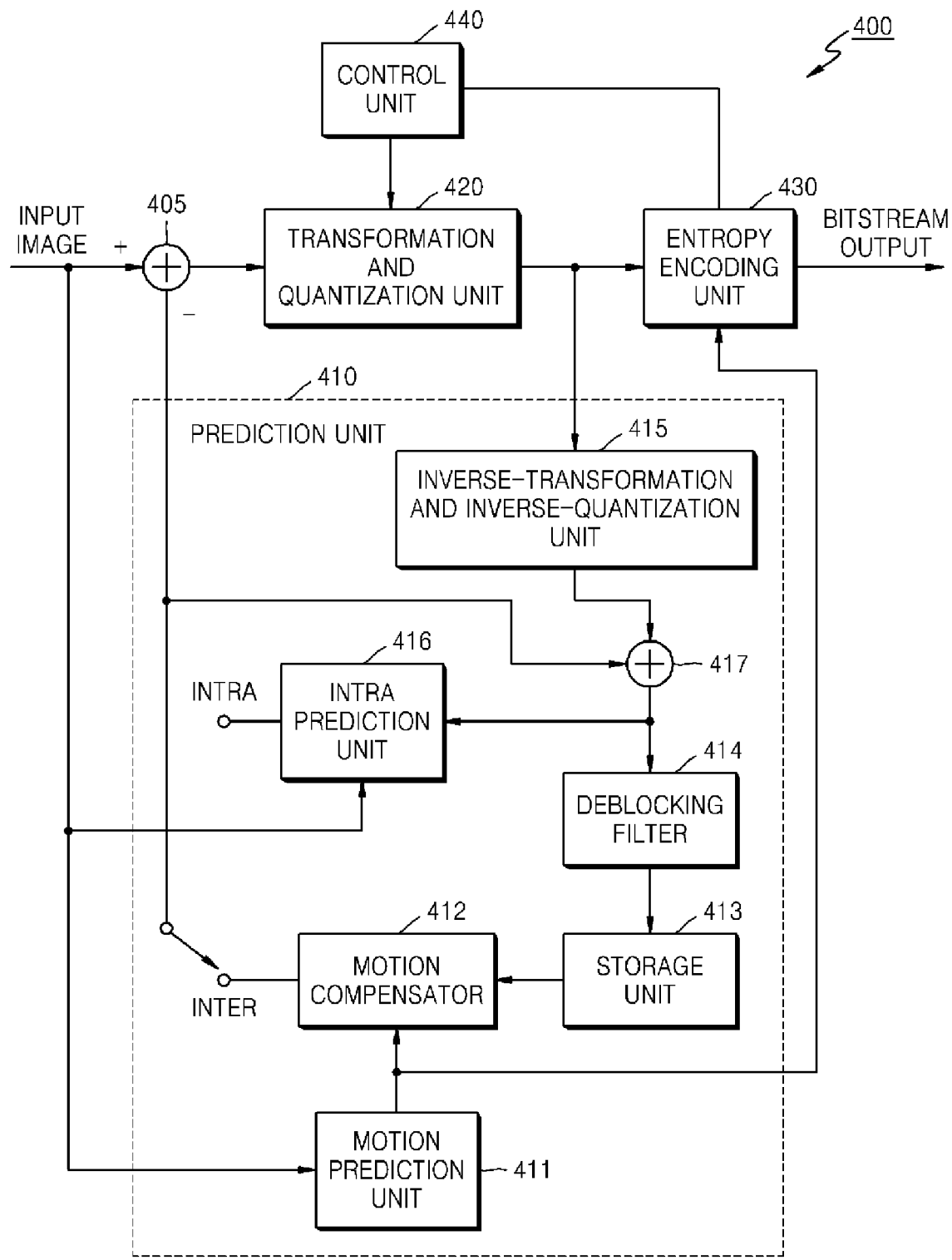
FIG. 4 is a block diagram for illustrating a structure of an image encoding device to which a transform coefficient encoding apparatus is applied according to an exemplary embodiment of the present invention.
Figure 5:
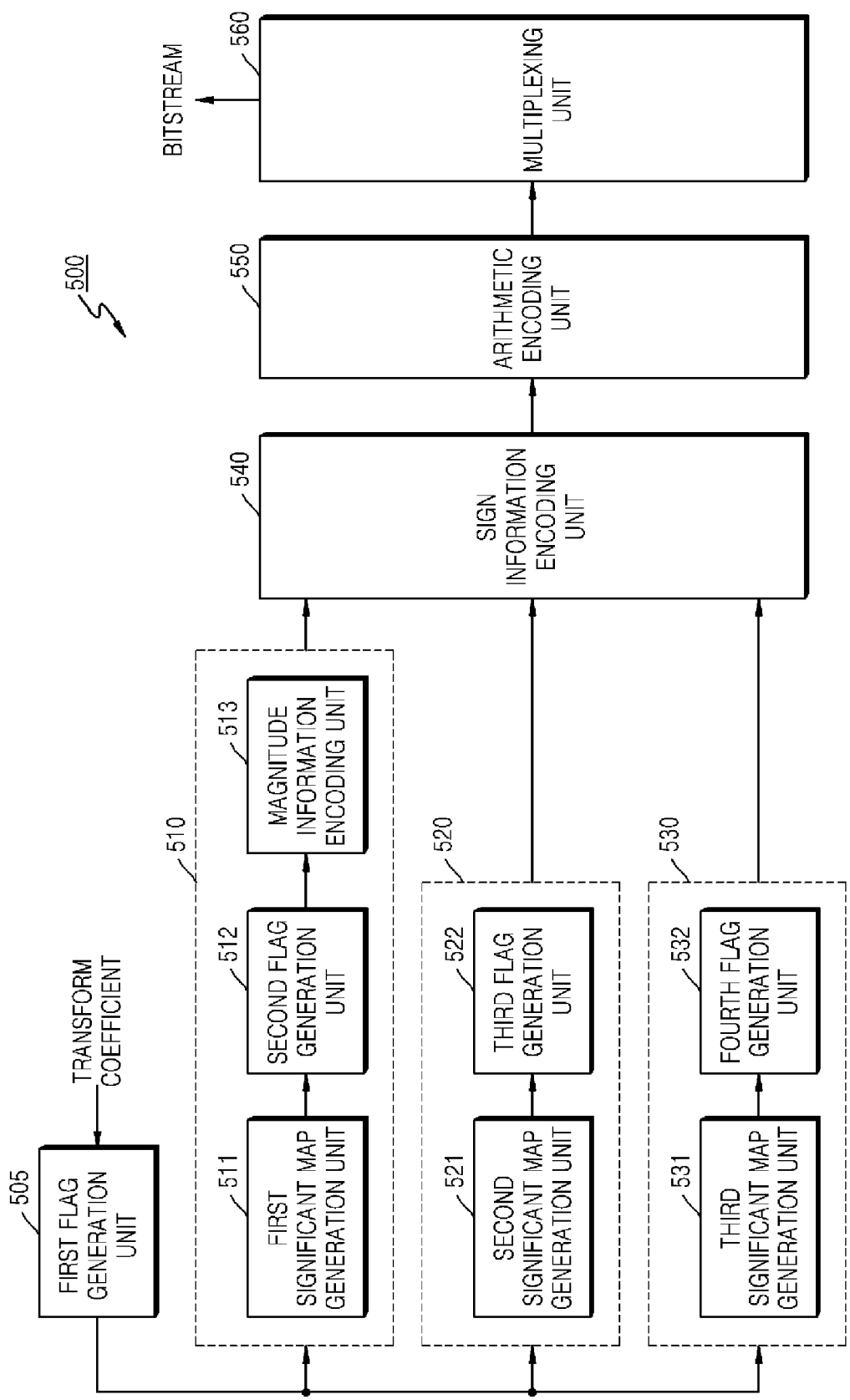
FIG. 5 is a block diagram for illustrating a structure of the transform coefficient encoding apparatus according to another exemplary embodiment of the present invention.

FIG. 4 is a block diagram for illustrating a structure of an image encoding device 400 to which a transform coefficient encoding apparatus 500 illustrated in FIG. 5 is applied according to an exemplary embodiment of the present invention.

Referring to FIG. 4, the image encoding device 400 includes a subtraction unit 405, a prediction unit 410, a transformation and quantization unit 420, an entropy encoding unit 430, and a control unit 440. The transform coefficient encoding apparatus 500 according to the exemplary embodiments of the present invention is included in the entropy encoding unit 430.

The prediction unit 410 divides an input image into blocks having a predetermined size, and performs inter prediction or intra prediction for each of the divided blocks so as to generate a prediction block. To be more specific, a motion prediction unit 411 performs motion prediction which generates a motion vector indicating an area which is similar to a current block and which is in a predetermined search area of a reference picture that has been previously encoded and reconstructed. A motion compensator 412 obtains corresponding area data of the reference picture indicated by the generated motion vector, and performs motion compensation which generates the prediction block of the current block. Also, an intra prediction unit 416 performs the intra prediction generating the prediction block by using data of neighboring blocks adjacent to the current block.

The subtraction unit 405 generates a residual obtained by subtracting data of an original image from the prediction block of the current block generated by the prediction unit 410. The transformation and quantization unit 420 transforms the residual into a frequency area by performing frequency transformation such as discrete cosine transformation (DCT), and quantizes the transformed residual, thereby outputting quantized transform coefficients. Hereinafter, in the exemplary embodiments of the present invention, a transform coefficient means the transformed and quantized coefficient which has been transformed and quantized by the transformation and quantization unit 420.

The entropy encoding unit 430 performs variable length coding for the transform coefficient so as to generate a bitstream. The transform coefficient encoding apparatus 500, to be described later, included in the entropy encoding unit 430, divides the transform coefficients into group units according to a predetermined threshold value, and generates additional information such as a significant map and magnitude information for the transform coefficient group units respectively, thereby encoding the transform coefficients.

An inverse-transformation and inverse-quantization unit 415 performs inverse-transformation and inverse-quantization for the transformed and quantized residual data so as to reconstruct residual data. An addition unit 417 adds the reconstructed residual data and prediction data so as to reconstruct the current block. The reconstructed current block is stored in a storage unit 413 after passing through a deblocking filter 414, and is used as reference data for a next block.

The control unit 440 controls each component of the image encoding device 400, and compares bitstream costs of each of prediction modes so as to determine an optimal prediction mode for encoding the current block.

FIG. 5 is a block diagram for illustrating a structure of the transform coefficient encoding apparatus 500 according to another exemplary embodiment of the present invention. As described above, the transform coefficient encoding apparatus 500 is included in the entropy encoding unit 430 of FIG. 4, and is used so as to encode quantized transform coefficients.

Referring to FIG. 5, the transform coefficient encoding apparatus 500 according to the exemplary embodiment of the present invention includes a first flag generation unit 505, a first transform coefficient encoding unit 510, a second transform coefficient encoding unit 520, a significant coefficient encoding unit 530, a sign information encoding unit 540, an arithmetic encoding unit 550, and a multiplexing unit 560.

The first flag generation unit 505 reads transform coefficients in a current block according to a predetermined scan order, and determines whether a first transform coefficient having an absolute value greater than a predetermined threshold value N (here, N is a positive number greater than 2) exists in the transform coefficients included in the current block, thereby generating first flag information indicating whether the first transform coefficient exists. To be more specific, in the case where a transform coefficient having an absolute value greater than N exists in the transform coefficients of the current block, the first flag generation unit 505 sets a first flag as 1. However, in the case where the transform coefficients of the current block only have an absolute value less than N, the first flag generation unit 505 sets the first flag as 0. For example, when N is 2, if a first transform coefficient having an absolute value greater than 2 exists in the transform coefficients included in the current block, the first flag generation unit 505 sets the first flag as 1. If the transform coefficients included in the current block only have absolute values of −1, 0, and 1, which are less than 2, the first flag generation unit 505 sets the first flag as 0. As will be described later, in the case where the transform coefficient having an absolute value greater than N does not exist, a significant map for a significant coefficient is generated so that encoding is performed, similarly to the related art method.

When the first flag generation unit 505 sets the first flag as 1, that is, when the transform coefficient having an absolute value greater than N exists in the transform coefficients of the current block, the first transform coefficient encoding unit 510 encodes information of a first transform coefficient that is the transform coefficient which has an absolute value greater than N and which is from among the transform coefficients of the current block.

The first transform coefficient encoding unit 510 includes a first significant map generation unit 511, a second flag generation unit 512, and a magnitude information encoding unit 513. The first significant map generation unit 511 generates a first significant map indicating a position of the first transform coefficient in the current block. According to the predetermined scan order, the second flag generation unit 512 generates second flag information indicating whether each first transform coefficient is a last of the first transform coefficients that exist in the current block. The magnitude information encoding unit 513 encodes magnitude information of the first transform coefficient. At this time, the magnitude information encoding unit 513 may use a value as the magnitude information of the first transform coefficient, wherein the value (abs-N) is obtained by subtracting N from the absolute value (abs) of the first transform coefficient, and may not use the constant magnitude of each first transform coefficient.

The second transform coefficient encoding unit 520 encodes transform coefficients having an absolute value less than N, that is, second transform coefficients which are remaining transform coefficients from among the transform coefficients of the current block, excluding the first transform coefficient.

The second transform coefficient encoding unit 520 includes a second significant map generation unit 521 and a third flag generation unit 522. The second significant map generation unit 521 generates a second significant map indicating a position of the second transform coefficients in the current block. To be more specific, from among the second transform coefficients which are the remaining transform coefficients from among the transform coefficients of the current block, excluding the first transform coefficient, the second significant map generation unit 521 sets a non-zero significant coefficient as 1, and sets a zero transform coefficient as 0 so as to generate the second significant map indicating a position of a significant coefficient from among the second transform coefficients. According to the predetermined scan order, the third flag generation unit 522 generates third flag information indicating whether each of the second transform coefficients corresponding to the non-zero significant coefficient is a last non-zero second transform coefficient existing in the current block.

When the first flag is set as 0 by the first flag generation unit 505, that is, when it is determined that all of the transform coefficients of the current block have an absolute value less than N, the significant coefficient encoding unit 530 encodes the transform coefficients of the current block. The significant coefficient encoding unit 530 includes a third significant map generation unit 531 and a fourth flag generation unit 532. Similarly to the related art method, the third significant map generation unit 531 generates a third significant map indicating a position of a non-zero significant coefficient in the transform coefficients of the current block, and the fourth flag generation unit 532 generates a fourth flag indicating whether each significant coefficient is a last significant coefficient included in the current block. The third significant map corresponds to a significant map according to the related art method, and the fourth flag corresponds to an end-of-block (EOB) flag.

The sign information encoding unit 540 encodes sign information of the transform coefficients encoded by the first transform coefficient encoding unit 510, the second transform coefficient encoding unit 520, and the significant coefficient encoding unit 530. That is, the sign information encoding unit 540 encodes information indicating whether each of the encoded transform coefficients has a positive value or a negative value.

The arithmetic encoding unit 550 performs Context Adaptive Binary arithmetic Coding (CABAC) on the first flag information, the first significant map, the second flag information, the second significant map, the third flag information, the third significant map, and the fourth flag information, thereby generating a bitstream. At this time, the arithmetic encoding unit 550 may perform the CABAC by applying differed contexts to each of information about the first transform coefficients having an absolute value greater than the threshold value N, information about the second transform coefficients having an absolute value less than the threshold value N, excluding the first transform coefficient, and information about the significant coefficients corresponding to the case in which the current block only has an absolute value less than the threshold value N. This is because, when the transform coefficients having a relatively similar absolute value based on a threshold value are divided into groups and encoded according to the present invention, there is a difference in an absolute value distribution between each of the divided transform coefficient groups. Thus, it is more efficient to perform the CABAC based on differed probability models. For example, when the information about the second transform coefficients is encoded according to the exemplary embodiment of the present invention, the first transform coefficients having an absolute value greater than N are filtered so that an absolute value difference between each of the second transform coefficients is reduced, compared to the related art method in which encoding is performed by dividing transform coefficients into a zero transform coefficient and a non-zero significant coefficient. Thus, when transform coefficients having a relatively narrow distribution are encoded, a performance of the CABAC may be improved by performing the encoding according to the differing probability models.

A multiplexing unit 560 multiplexes the first flag information, the first significant map, the second flag information, the second significant map, the third flag information, the third significant map, the fourth flag information, and prediction mode information of the current block, which are arithmetically encoded, thereby generating a bitstream.

Meanwhile, when the threshold value N is 2, only the first transform coefficient has an absolute value greater than 2 and remaining transform coefficients have an absolute value less than 2. Thus, the magnitude information encoding unit 513 may be included in the first transform coefficient encoding unit 510. However, when N has a value greater than 3, the remaining transform coefficients excluding the first transform coefficient may have an absolute value greater than 2. Thus, in this case, the second transform coefficient encoding unit 520 and the significant coefficient encoding unit 530 may include a means for encoding magnitude information.

Hereinafter, a procedure in which a transform coefficient block having a 4×4 size is encoded will now be described in relation to FIGS. 6A through 7, according to an exemplary embodiment of the present invention.

Figure 6A:
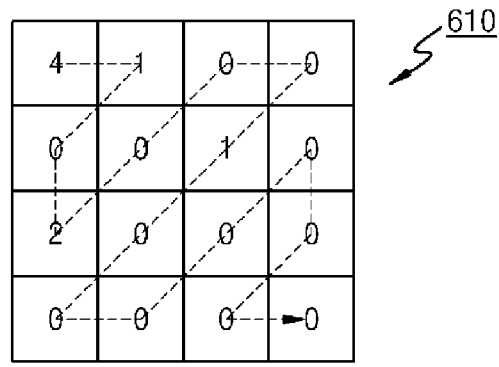
FIG. 6A is a reference diagram of a transform coefficient block having a 4×4 size.
Figure 6B:
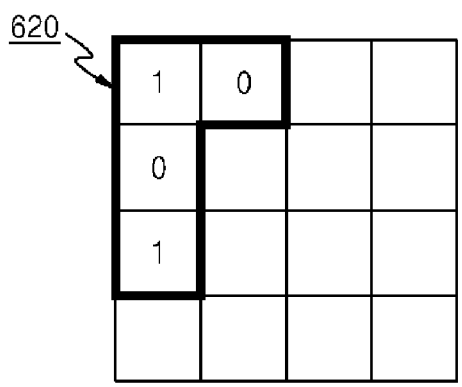
FIG. 6B is a reference diagram of a first significant map generated from the transform coefficient block of FIG. 6A.
Figure 6C:
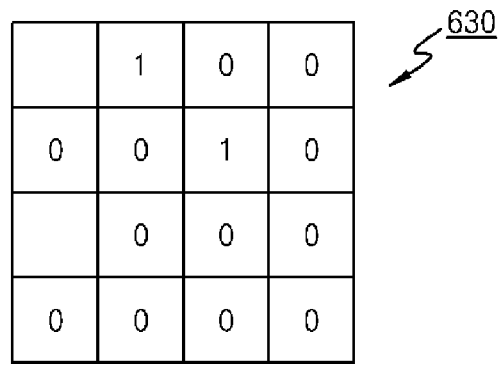
FIG. 6C is a reference diagram of a second significant map generated from the transform coefficient block of FIG. 6A.

FIG. 6A is a reference diagram of a transform coefficient block 610 having a 4×4 size. FIG. 6B is a reference diagram of a first significant map generated from the transform coefficient block 610 of FIG. 6A. FIG. 6C is a reference diagram of a second significant map generated from the transform coefficient block 610 of FIG. 6A.

Referring to FIGS. 5 through 6C, the first flag generation unit 505 determines whether a first transform coefficient having an absolute value greater than a predetermined threshold value N exists in the transform coefficient block 610 to be encoded. If the first transform coefficient having an absolute value greater than N exists, a first flag is set as 1. If the first transform coefficient having an absolute value greater than N does not exist, the first flag is set as 0. Assuming that N is 2, since the transform coefficient block 610 of FIG. 6A includes transform coefficients having values of 4 and 2, the first flag is set as 1.

When the first flag is set as 1, the first significant map generation unit 511 scans transform coefficients existing at each index position according to a predetermined scan order, detects a first transform coefficient that is a transform coefficient having an absolute value greater than 2 that is a predetermined threshold value, and generates a first significant map 620 indicating a position of the detected first transform coefficient. At this time, as illustrated in FIG. 6A, the first significant map 620 is generated only for a first transform coefficient through a last of the first transform coefficients according to the predetermined scan order. That is, according to a scan order illustrated in FIG. 6A, the last of the first transform coefficients is a fourth scanned transform coefficient having an absolute value 2. Thus, in this case, the first significant map generation unit 511 allocates 1 to a transform coefficient which has an absolute value greater than 2 and which is from among the scanned transform coefficients, and allocates 0 to a transform coefficient having an absolute value less than 2 so as to generate the first significant map 620, while scanning the first transform coefficient through the fourth scanned transform coefficient that is the last of the first transform coefficients, according to the scan order.

The second significant map generation unit 521 generates a second significant map 630 indicating a position of a non-zero significant coefficient from among second transform coefficients which are remaining transform coefficients from among the transform coefficients of the transform coefficient block 610, excluding the first transform coefficients. As described above, when N is 2, the second significant map generation unit 521 allocates 1 to a non-zero second transform coefficient, and allocates 0 to a zero second transform coefficient having an absolute value 0 so as to generate the second significant map 630, while scanning the remaining transform coefficients according to the scan order, except for the first transform coefficients which have an absolute value greater than 2 and which are detected by the first significant map generation unit 511.

FIG. 7 is a reference diagram for illustrating a procedure of arraying the transform coefficient block 610 of FIG. 6A in a one-dimensional array, and encoding the transform coefficient block 610, according to another exemplary embodiment of the present invention. The procedure of arraying and encoding a transform coefficient block is given for convenience of description, and it will be clearly understood by one of ordinary skill in the art that transform coefficient information may be encoded without re-arraying a transform coefficient block in the one-dimensional array.

Referring to FIG. 7, the first significant map generation unit 511 scans the 4×4 transform coefficient block 610 of FIG. 6A according to a predetermined scan order, and arrays transform coefficients in a one-dimensional array 710. The first significant map generation unit 511 allocates 1 to a transform coefficient which has an absolute value greater than a threshold value N and which is from among the transform coefficients arrayed in the one-dimensional array 710, and allocates 0 to a transform coefficient having an absolute value less than the threshold value N, thereby generating a first significant map 720 indicating a position of the transform coefficient having an absolute value greater than N. As described above, the first significant map 720 does not need to be generated for all transform coefficients in the 4×4 transform coefficient block 610 but is generated until a last of the first transform coefficients according to the predetermined scan order is reached. The second flag generation unit 512 sets a second flag 730 indicating whether each of the first transform coefficients having a value 1 in the first significant map 720 is the last of the first transform coefficients. When N is 2, from among the transform coefficients arrayed in the one-dimensional array 710, since only first and fourth transform coefficients correspond to the first transform coefficient, the first significant map 720 is generated only for the first transform coefficient through the fourth transform coefficient. Also, the first and fourth transform coefficients are respectively 4 and 2, and have an absolute value greater than a threshold value 2, thus, only the first and fourth transform coefficients have a value 1 in the first significant map 720. Also, in the second flag 730 OK, 1 is set to a last of the first transform coefficients from among the first and fourth transform coefficients which are the first transform coefficients included in the current block.

The second significant map generation unit 521 allocates 1 to non-zero transform coefficients from among the second transform coefficients which are remaining transform coefficients from among the transform coefficients arrayed in the one-dimensional array 710, excluding the first transform coefficients, and allocates 0 to zero transform coefficients, thereby generating a second significant map 740. The third flag generation unit 522 allocates 1 to a last non-zero second transform coefficient from among the non-zero second transform coefficients which are set as 1 in the second significant map 740, and allocates 0 to the rest of the non-zero second transform coefficients, thereby generating a third flag 750.

The magnitude information encoding unit 513 encodes first transform coefficient's magnitude information 760. At this time, the magnitude information encoding unit 513 does not encode the constant magnitude of the first transform coefficient but uses a value as the first transform coefficient's magnitude information 760, wherein the value is obtained by subtracting the threshold value N from the absolute value of the first transform coefficient. When N is 2, a threshold value 2 is subtracted from an absolute value 4 of the first transform coefficient so that a value 2 is obtained and is encoded as magnitude information of the first transform coefficient, and the threshold value 2 is subtracted from an absolute value 2 of the fourth transform coefficient so that a value 0 is obtained and is encoded as magnitude information of the fourth transform coefficient.

Figure 8:
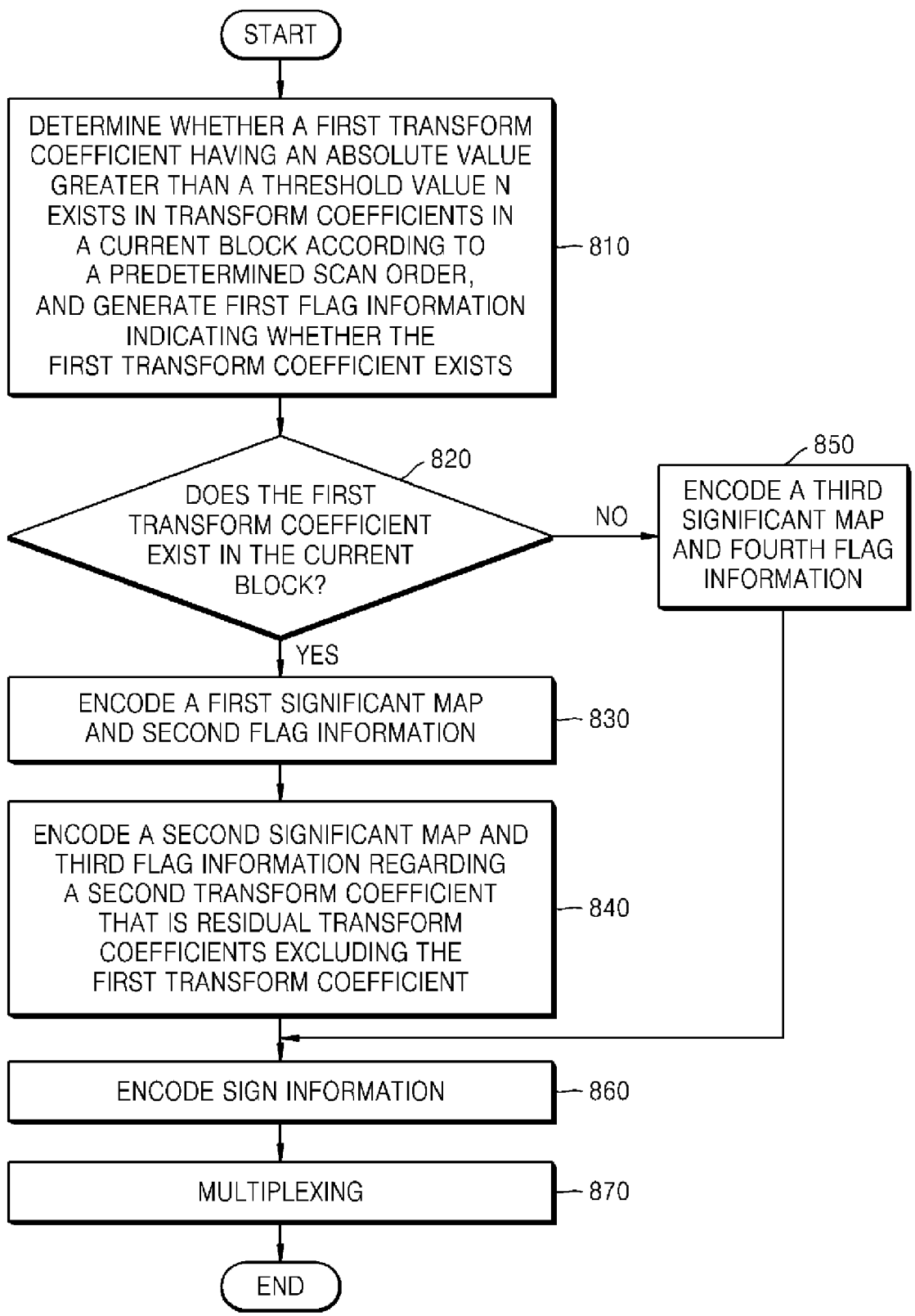
FIG. 8 is a flowchart of a method of encoding a transform coefficient according to another exemplary embodiment of the present invention.

FIG. 8 is a flowchart of a method of encoding a transform coefficient according to another exemplary embodiment of the present invention.

Referring to FIG. 8, in operation 810, the method reads transform coefficients in a current block according to a predetermined scan order, determines whether a first transform coefficient having an absolute value greater than a predetermined threshold value N (here, N is a positive number greater than 2) exists in the transform coefficients in the current block, and generates first flag information indicating whether the first transform coefficient exists. As described above, when a transform coefficient having an absolute value greater than N exists in the current block, a first flag is set as 1. Otherwise, the first flag is set as 0.

In operation 820, whether the first transform coefficient exists in the current block is determined from the first flag information. When the first transform coefficient exists in the current block, in operation 830, a first significant map indicating a position of the first transform coefficient is encoded and second flag information indicating whether the first transform coefficient corresponds to a last of the first transform coefficients is encoded. Also, in operation 840, from among second transform coefficients which are remaining transform coefficients excluding the first transform coefficient, 1 is allocated to non-zero significant coefficients and 0 is allocated to zero transform coefficients so that a second significant map is generated. Third flag information, indicating whether each of the non-zero second coefficients is a last non-zero transform coefficient, is encoded.

When the first transform coefficient does not exist in the current block, in operation 850, the transform coefficients of the current block are divided into non-zero significant coefficients and zero transform coefficients, similarly to the related art method. Afterward, a third significant map indicating a position of the non-zero significant coefficients is generated, and fourth flag information, indicating whether each of the non-zero significant coefficients is a last significant coefficient, is generated so that the third significant map and the fourth flag information are encoded.

In operation 860, sign information about the non-zero significant coefficients is encoded. In operation 870, the first flag information, the first significant map, the second flag information, the second significant map, the third flag information, the third significant map, the fourth flag information, and prediction mode information of the current block are multiplexed so as to generate a bitstream.

Meanwhile, the method of encoding the transform coefficient and the transform coefficient encoding apparatus according to the exemplary embodiment of the present invention divide and encode the transform coefficients according to a single threshold value N but the present invention is not limited thereto and the transform coefficients may be divided and encoded according to a plurality of threshold values. For example, when the transform coefficients are divided according to three threshold values which are 2, 4, and 8, the transform coefficients having an absolute value greater than 8 may be set as a first transform coefficient, the transform coefficients having an absolute value between 4 and 8 may be set as a second transform coefficient, the transform coefficients having an absolute value between 2 and 4 may be set as a third transform coefficient, and the transform coefficients having an absolute value less than 2 may be set as a fourth transform coefficient. Then, a significant map and flag information are generated for each of the first through fourth transform coefficients so as to encode the transform coefficients.

Figure 9:
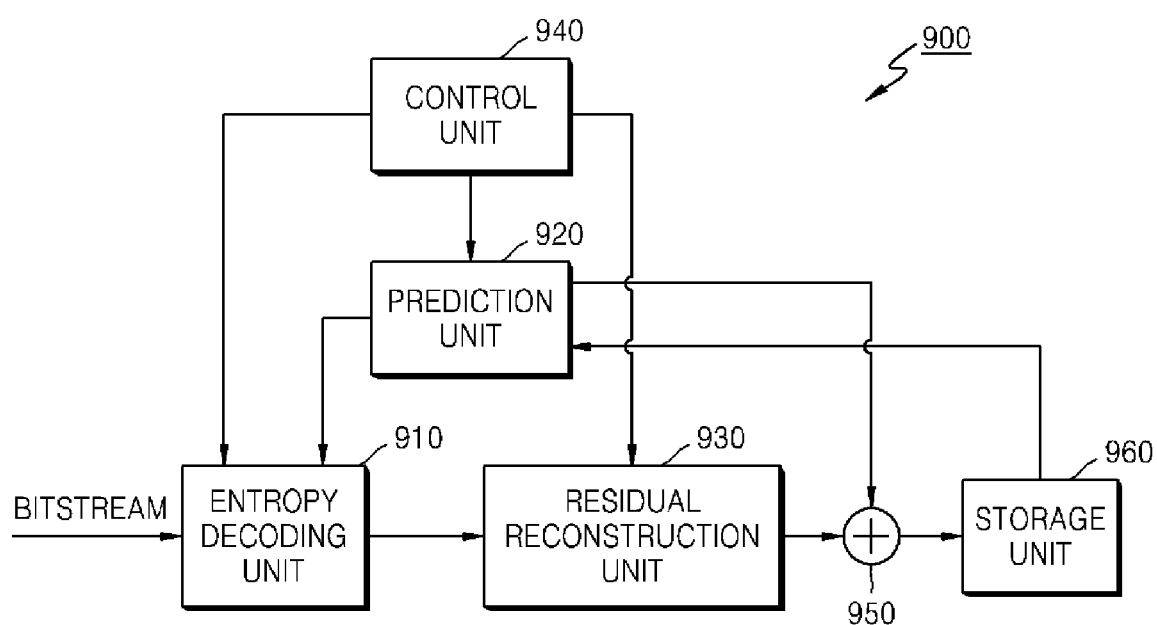
FIG. 9 is a block diagram for illustrating a structure of an image decoding device to which a transform coefficient decoding apparatus is applied according to another exemplary embodiment of the present invention.

FIG. 9 is a block diagram for illustrating a structure of an image decoding device 900 to which a transform coefficient decoding apparatus 1000 is applied according to another exemplary embodiment of the present invention.

Referring to FIG. 9, the image decoding device 900 includes an entropy decoding unit 910, a prediction unit 920, a residual reconstruction unit 930, a control unit 940, an addition unit 950, and a storage unit 960. The transform coefficient decoding apparatus 1000 is included in the entropy decoding unit 910.

The entropy decoding unit 910 extracts information about a transform coefficient of a current block to be encoded, from an input bitstream. The entropy decoding unit 910 decodes the transform coefficient of the current block by using the extracted information about the transform coefficient, and outputs the decoded transform coefficient to the residual reconstruction unit 930. The residual reconstruction unit 930 performs inverse-quantization and inverse-transformation on the transform coefficient, and reconstructs a residual. The prediction unit 920 generates and outputs a prediction image according to a prediction mode of the current block extracted from the bitstream. The addition unit 950 adds the prediction image and the reconstructed residual so as to reconstruct the current block. The reconstructed current block is stored in the storage unit 950, and is used to decode a next block. The control unit 940 controls each component of the image decoding device 900.

Figure 10:
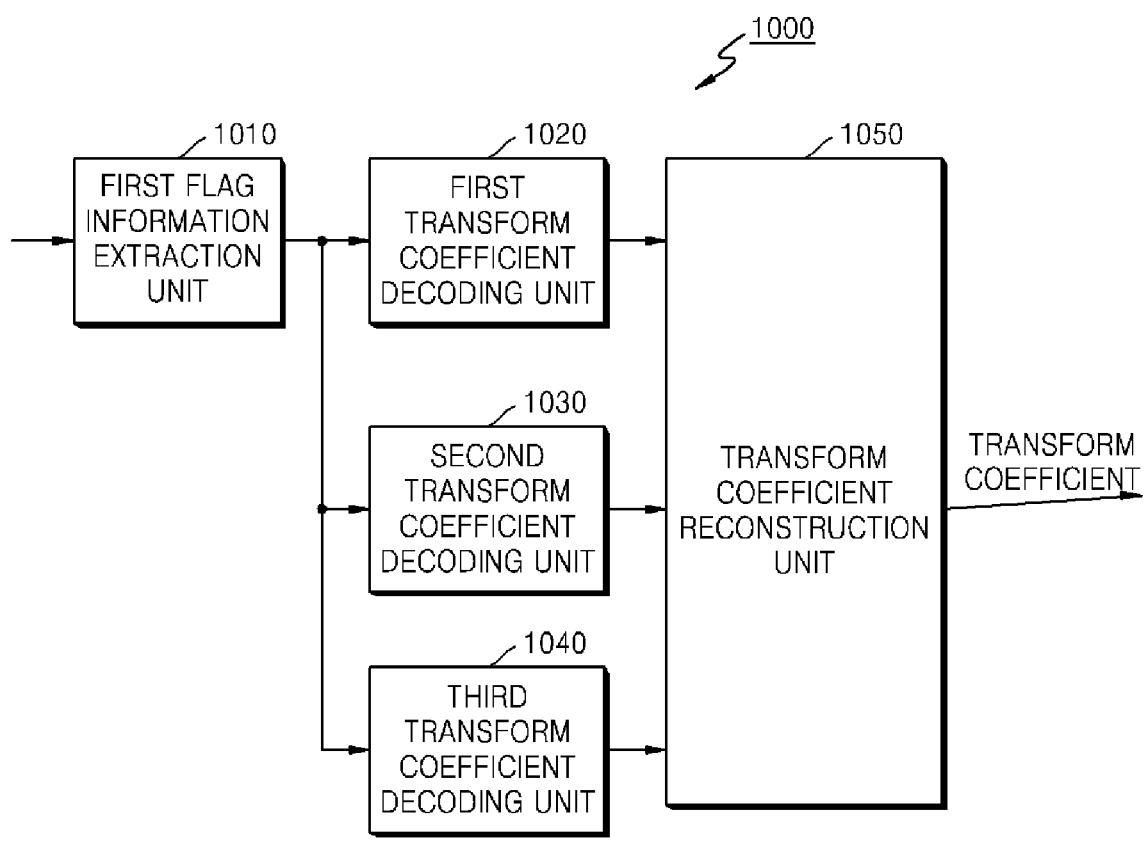
FIG. 10 is a block diagram for illustrating a structure of the transform coefficient decoding apparatus according to another exemplary embodiment of the present invention.

FIG. 10 is a block diagram for illustrating a structure of the transform coefficient decoding apparatus 1000 according to another exemplary embodiment of the present invention. Referring to FIG. 10, the transform coefficient decoding apparatus 1000 according to the exemplary embodiment of the present invention includes a first flag information extraction unit 1010, a first transform coefficient decoding unit 1020, a second transform coefficient decoding unit 1030, a third transform coefficient decoding unit 1040, and a transform coefficient reconstruction unit 1050.

The first flag information extraction unit 1010 extracts and reads first flag information indicating whether a first transform coefficient having an absolute value greater than a predetermined threshold value N is included in a current block to be decoded, from a bitstream, thereby determining whether the first transform coefficient exists in the current block. When it is determined that the first transform coefficient having an absolute value greater than N is included in the current block, the first transform coefficient decoding unit 1020 decodes the first transform coefficient included in the current block by using a first significant map, a second flag, sign and magnitude information of the first transform coefficient, which are extracted from the bitstream. Also, the second transform coefficient decoding unit 1030 decodes a second transform coefficient by using a second significant map, a third flag, and sign information of the second transform coefficient, which are extracted from the bitstream. The decoded first and second transform coefficients are associated by the transform coefficient reconstruction unit 1050 so that all of the transform coefficients in the current block are decoded.

When a first flag is 0, that is, when it is determined that a transform coefficient having an absolute value greater than N does not exist in the current block, the third transform coefficient decoding unit 1040 decodes transform coefficients, which have an absolute value less than N and which are included in the current block, by using a third significant map, fourth flag information, and sign information of a significant coefficient, which are extracted from the bitstream.

FIG. 11 is a flowchart of a method of decoding a transform coefficient, according to another exemplary embodiment of the present invention.

Referring to FIG. 11, in operation 1110, the method extracts first flag information indicating whether a first transform coefficient having an absolute value greater than a predetermined threshold value N (here, N is a positive number greater than 2) is included in a current block to be decoded, from a bitstream. In operation 1120, the method reads the extracted first flag information, and determines whether the first transform coefficient exists in the current block. When the first transform coefficient exists in the current block, in operation 1130, a first significant map indicating a position of the first transform coefficient, and magnitude and sign information of the first transform coefficient are extracted from the bitstream. In operation 1140, the first transform coefficient is decoded by using the extracted first significant map, and the magnitude and sign information of the first transform coefficient. Also, in operation 1150, a second significant map indicating a position of a second transform coefficient that indicates residual transform coefficients excluding the first transform coefficient, and sign information of the second transform coefficient are extracted from the bitstream. In operation 1160, the second transform coefficient is decoded by using the extracted second significant map and the sign information of the second transform coefficient.

When the first transform coefficient does not exist in the current block, in operation 1170, a third significant map indicating a position of a significant coefficient, and sign information of the significant coefficient are extracted from the bitstream. In operation 1180, only transform coefficients having an absolute value less than N in the current block are decoded by using the extracted third significant map and the sign information of the significant coefficient.

According to the exemplary embodiment of the present invention, transform coefficients having a greater correlation can be separately divided and encoded so that context modeling can be achieved. By doing so, a compression performance of the transform coefficients can be improved.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

The invention can also be embodied as computer readable codes on a computer readable transmission medium which may include carrier waves (such as data transmission through the Internet).

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method, in a computing device comprising a processor having computing device-executable instructions, of encoding transform coefficients, the method comprising:
    reading, by the processor, transform coefficients in a current block according to a predetermined scan order,
    determining whether a first transform coefficient having an absolute value greater than a predetermined threshold value N exists in the transform coefficients in the current block, and generating first flag information indicating whether the first transform coefficient exists;
    encoding information of the first transform coefficient;
    encoding information of a second transform coefficient that indicates remaining transform coefficients existing in the current block, except for the first transform coefficient; and
    adding the first flag information, the encoded information of the first transform coefficient, and the encoded information of the second transform coefficient to a bitstream,
    wherein the predetermined threshold value N is a positive number greater than 2, and
    wherein the encoding of the information of the first transform coefficient comprises:
    generating a first significant map indicating a position of the first transform coefficient if the first transform coefficient exists;
    generating a second flag indicating whether the first transform coefficient is a last of the first transform coefficients existing in the current block according to the predetermined scan order; and
    encoding magnitude information of the first transform coefficient, and
    wherein the encoding of the information of the second transform coefficient comprises:
    generating a second significant map indicating a position of a non-zero significant coefficient from among remaining transform coefficients; and
    generating a third flag indicating whether the second transform coefficient corresponding to the non-zero significant coefficient is a last of the second transform coefficient.

2. The method of claim 1, wherein the first significant map is generated by reading transform coefficients from an initial transform coefficient to the last of the first transform coefficients from among the transform coefficients in the current block according to the predetermined scan order, and by allocating 1 to the read transform coefficient that corresponds to the first transform coefficient and allocating 0 to a read transform coefficient that does not correspond to the first transform coefficient.

3. The method of claim 1, wherein the second flag is allocated only to the first transform coefficient from among the transform coefficients in the current block, and wherein 1 is allocated to the last of the first transform coefficients from among the first transform coefficients in the current block according to the predetermined scan order and 0 is allocated to remaining first transform coefficients.

4. The method of claim 1, wherein the encoding of the magnitude information of the first transform coefficient comprises encoding a difference value between the first transform coefficient and the threshold value N, as the magnitude information.

5. The method of claim 1 if the first transform coefficient does not exist in the current block, the method further comprising encoding a third significant map indicating a position of non-zero significant coefficients from among the transform coefficients in the current block, and a fourth flag indicating whether each of the non-zero significant coefficients is a last significant coefficient from among significant coefficients in the current block.

6. The method of claim 1, wherein Context Adaptive Binary Arithmetic Coding (CABAC) is performed on the encoding information of the first transform coefficient and the encoding information of the second transform coefficient, according to different context models.

7. A transform coefficient encoding apparatus comprising:
    a first flag generation unit which reads transform coefficients in a current block according to a predetermined scan order, determines whether a first transform coefficient which has an absolute value greater than a predetermined threshold value N exists in the transform coefficients in the current block, and generating first flag information indicating whether the first transform coefficient exists;
    a first transform coefficient encoding unit which encodes information of the first transform coefficient;
    a second transform coefficient encoding unit which encodes information of a second transform coefficient that indicates remaining transform coefficients existing in the current block, except for the first transform coefficient; and
    a multiplexing unit which adds the first flag information, the encoded information of the first transform coefficient, and the encoded information of the second transform coefficient to a bitstream, wherein the predetermined threshold value N is a positive number greater than 2, and wherein the first transform coefficient encoding unit comprises:
a first significant map generation unit which generates a first significant map indicating a position of the first transform coefficient;
a second flag generation unit which generates a second significant map indicating whether the first transform coefficient is a last of the first transform coefficients existing in the current block according to the predetermined scan order; and
a magnitude information encoding unit which encodes magnitude information of the first transform coefficient, and wherein the second transform coefficient encoding unit comprises:
a second significant map generation unit which generates a second significant map indicating a position of a non-zero significant coefficient from among the remaining transform coefficients; and
a third flag generation unit which generates a third flag indicating whether the second transform coefficient corresponding to the non-zero significant coefficient is a last of the second transform coefficients.

8. The transform coefficient encoding apparatus of claim 7, wherein the first significant map generation unit reads transform coefficients from an initial transform coefficient to the last of the first transform coefficients from among the transform coefficients in the current block according to the predetermined scan order, and allocates 1 to the read transform coefficient that corresponds to the first transform coefficient, and allocates 0 to the read transform coefficient that does not correspond to the first transform coefficient.

9. The transform coefficient encoding apparatus of claim 7, wherein the second flag generation unit allocates 1 to the last of the first transform coefficients from among the transform coefficients in the current block according to the predetermined scan order, and allocates 0 to remaining first transform coefficients.

10. The transform coefficient encoding apparatus of claim 7, wherein the magnitude information encoding unit encodes a difference value between the first transform coefficient and the threshold value N, as the magnitude information.

11. The transform coefficient encoding apparatus of claim 7, wherein if the first transform coefficient does not exist in the current block, further comprising:
a third significant map generation unit which generates a third significant map indicating a position of non-zero significant coefficients from among the transform coefficients in the current block; and
a fourth flag generation unit which generates a fourth flag indicating whether each of the non-zero significant coefficients is a last of the significant coefficients from among significant coefficients in the current block.

12. The transform coefficient encoding apparatus of claim 7, further comprising an arithmetic encoding unit which performs Adaptive Binary Arithmetic Coding (CABAC) on each of the first and second transform coefficients, according to different context models.

13. A method, in a computing device comprising a processor having computing device-executable instructions, of decoding transform coefficients, the method comprising:
extracting, by the processor, first flag information indicating whether a first transform coefficient having an absolute value greater than a predetermined threshold value N exists in a current block to be decoded, from a bitstream;
extracting a first significant map indicating a position of the first transform coefficient, and magnitude and sign information of the first transform coefficient from the bitstream when it is determined that the first transform coefficient exists in the current block according to a result of reading the extracted first flag information;
decoding the first transform coefficient by using the extracted first significant map, and the extracted magnitude and sign information of the first transform coefficient;
extracting a second significant map indicating a position of a second transform coefficient that indicates remaining transform coefficients excluding the first transform coefficient, and sign information of the second transform coefficient from the bitstream; and
decoding the second transform coefficient by using the extracted second significant map and the extracted sign information of the second transform coefficient,
wherein the predetermined threshold value N is a positive number greater than 2.

14. The method of claim 13, if it is determined that the first transform coefficient does not exist in the current block according to the result of reading the extracted first flag information, the method further comprising:
extracting a third significant map indicating a position of non-zero significant coefficients from among the transform coefficients in the current block, and sign information of the non-zero significant coefficients; and
decoding the non-zero significant coefficients by using the extracted third significant map and the extracted sign information of the non-zero significant coefficients.

15. The method of claim 13, wherein Context Adaptive Binary Arithmetic Decoding (CABAD) is performed on the first transform coefficient and the second transform coefficient, according to different context models.

16. A transform coefficient decoding apparatus comprising:
a first flag information extraction unit which extracts first flag information indicating whether a first transform coefficient which has an absolute value greater than a predetermined threshold value N exists in a current block to be decoded, from a bitstream;
a first transform coefficient decoding unit which extracts a first significant map indicating a position of the first transform coefficient, and magnitude and sign information of the first transform coefficient from the bitstream when it is determined that the first transform coefficient exists in the current block according to a result of reading the extracted first flag information, and decoding the first transform coefficient by using the extracted first significant map and the extracted magnitude and sign information of the first transform coefficient; and
a second transform coefficient decoding unit which extracts a second significant map indicating a position of a second transform coefficient that indicates remaining transform coefficients which exclude the first transform coefficient, and sign information of the second transform coefficient from the bitstream, and decodes the second transform coefficient by using the extracted second significant map and the extracted sign information of the second transform coefficient,
wherein the predetermined threshold value N is a positive number greater than 2.

17. The transform coefficient decoding apparatus of claim 16, further comprising a third transform coefficient decoding unit which extracts a third significant map indicating a position of non-zero significant coefficients from among the transform coefficients in the current block, and sign information of the non-zero significant coefficients, and decodes the non-zero significant coefficients by using the extracted third significant map and the extracted sign information of the non-zero significant coefficients.

18. The transform coefficient decoding apparatus of claim 16, wherein the first transform coefficient decoding unit and the second transform coefficient decoding unit respectively perform CABAD on the first transform coefficient and the second transform coefficient, according to different context models.

* * * * *